US012048940B2

(12) United States Patent
Yamauchi

(10) Patent No.: US 12,048,940 B2
(45) Date of Patent: Jul. 30, 2024

(54) ELECTROSTATIC COATING APPARATUS

(71) Applicant: ABB Schweiz AG, Baden (CH)

(72) Inventor: Kuniharu Yamauchi, Tokyo (JP)

(73) Assignee: ABB SCHWEIZ AG, Baden (CH)

( * ) Notice: Subject to any disclaimer, the term of this patent is extended or adjusted under 35 U.S.C. 154(b) by 590 days.

(21) Appl. No.: 17/222,046

(22) Filed: Apr. 5, 2021

(65) Prior Publication Data

US 2021/0283641 A1 Sep. 16, 2021

Related U.S. Application Data

(63) Continuation of application No. PCT/JP2019/028835, filed on Jul. 23, 2019.

(51) Int. Cl.
*B05B 15/55* (2018.01)
*B05B 5/04* (2006.01)
(Continued)

(52) U.S. Cl.
CPC ................ *B05B 15/55* (2018.02); *B05B 5/04* (2013.01); *B05B 5/08* (2013.01); *B08B 9/0328* (2013.01); *B08B 2209/032* (2013.01)

(58) Field of Classification Search
USPC ......................... 118/620–640, 323, 321, 302
See application file for complete search history.

(56) References Cited

U.S. PATENT DOCUMENTS

2020/0188948 A1* 6/2020 Kuniharu .............. B05B 3/1064

FOREIGN PATENT DOCUMENTS

CN 106573266 A 4/2017
JP H09997 A 1/1997
(Continued)

OTHER PUBLICATIONS

Japan Notification of Reasons for Refusal; issued by the Japanese Patent Office; regarding corresponding patent application Serial No. 2021-534453; dated Sep. 13, 2022; 8 pages (with English translation).

(Continued)

*Primary Examiner* — Yewebdar T Tadesse
(74) *Attorney, Agent, or Firm* — Greenberg Traurig, LLP

(57) ABSTRACT

Disclosed is an electrostatic coating apparatus including: an atomizing head cleaning flow path which is disposed at a coating machine and through which a cleaning fluid for cleaning a rotary atomizing head and a front end of a feed tube of a cartridge flows; a cleaning fluid flow path connecting a cleaning fluid supply source with the atomizing head cleaning flow path; a cleaning fluid valve disposed in the cleaning fluid flow path and configured to open and close the cleaning fluid flow path; a discharge air flow path connected to the atomizing head cleaning flow path and through which the discharge air flows; a cleaning fluid discharge flow path connected to the cleaning fluid flow path at a connection point located between the atomizing head cleaning flow path and the cleaning fluid valve; a discharge air switching valve disposed in the atomizing head cleaning flow path and configured to open and close the atomizing head cleaning flow path; and a cleaning fluid discharge valve disposed in the cleaning fluid discharge flow path and configured to open and close the cleaning fluid discharge flow path.

18 Claims, 6 Drawing Sheets

(51) Int. Cl.

| | |
|---|---|
| ***B05B 5/08*** | (2006.01) |
| ***B05B 13/04*** | (2006.01) |
| ***B08B 9/032*** | (2006.01) |

(56) References Cited

FOREIGN PATENT DOCUMENTS

| | | | |
|---|---|---|---|
| JP | H10 15441 | A | 1/1998 |
| JP | H1015441 | A | 1/1998 |
| JP | H10 80650 | A | 3/1998 |
| JP | H1080650 | A | 3/1998 |
| JP | H11128784 | A | 5/1999 |
| JP | 2003117447 | A | 4/2003 |
| WO | 2011037114 | A1 | 3/2011 |
| WO | 2012-060153 | A1 | 5/2012 |

OTHER PUBLICATIONS

European Search Report, App. No. EP 19938307.6, dated Mar. 22, 2023, 7 pages.
China First Office Action, issued by the National Intellectual Property Administration, regarding corresponding patent application Serial No. CN 201980064158.6; dated Feb. 22, 2022; 14 pages (with English translation).
Japanese Patent Office, Search Report issued in corresponding Application No. PCT/JP2019/028835, mailed Oct. 15, 2019, 5 pp.

* cited by examiner

ELECTROSTATIC COATING APPARATUS

FIELD

The present disclosure relates to an electrostatic coating apparatus for spraying a coating material applied with a high voltage toward an object to be coated.

BACKGROUND

In the case of coating an object to be coated such as a body of a vehicle, an electrostatic coating apparatus is used to increase the coating efficiency of the coating material. The electrostatic coating apparatus applies a high voltage to the coating material to perform coating. In addition, in recently disclosed coating apparatuses, use of a solvent such as a thinner is controlled in consideration of environment, and an aqueous coating material is used. However, when an aqueous coating is used, the applied high voltage leaks through the aqueous coating material in a coating material supply flow path from the coating apparatus to a coating material supply source. As a result, the coating apparatus using the aqueous coating material cannot directly apply a high voltage to the coating material for coating.

Therefore, among the electrostatic coating apparatuses, there is an electrostatic coating device with the coating material supply flow path being discarded as a factor of the leakage of the high voltage. The coating apparatus is a cartridge type electrostatic coating apparatus capable of suppressing the leakage of the high voltage even when the high voltage is directly applied to the aqueous coating material.

The cartridge type electrostatic coating apparatus is configured to include: a housing having a front side as a coating machine mounting portion and rear side becomes a cartridge mounting portion; a coating machine mounted at the coating machine mounting portion comprising an air motor having a hollow rotating shaft and a rotary atomizing head which is located at a front side of the air motor and disposed on the rotating shaft; a cartridge having a tank for storing the coating material and a feed tube extending from the tank to the rotary atomizing head, the feed tube being inserted into the rotating shaft and the tank being mounted at the cartridge mounting portion; and a high voltage generator disposed in the housing and applying a high voltage to the coating material discharged from the feed tube of the cartridge (patent document 1).

In addition, a coating apparatus is already known having a cleaning mechanism for cleaning the rotary atomizing head and the front end of the feed tube (patent document 2). The coating apparatus has a cleaning mechanism comprising: an atomizing head cleaning flow path which is located at the coating machine and through which a cleaning fluid (generally a cleaning liquid or cleaning air) for cleaning the rotary atomizing head and the front end of the feed tube flows; a cleaning fluid flow path connecting a cleaning fluid supply source with the atomizing head cleaning flow path; and a cleaning fluid valve disposed in the cleaning fluid flow path and configured to turn the cleaning fluid flow path on or off.

PATENT DOCUMENTS

Patent document 1: Japanese Unexamined Patent Application Publication No. 2003-117447

Patent document 2: Japanese Unexamined Patent Application Publication No. HEI 11-128784

SUMMARY

For example, in a structure in the cartridge type electrostatic coating apparatus in Patent Document 1 having the cleaning mechanism of Patent Document 2, the cleaning fluid can be used to clean the coating material adhered to the rotary atomizing head and the front end of the feed tube.

On the other hand, the high voltage supplied from the high voltage generator to the coating machine leaks through the cleaning liquid (a mixed liquid containing water and a thinner) used as the cleaning fluid. A high-resistance cleaning liquid is considered to be used to prevent the leakage of high voltage. However, use of the high-resistance cleaning liquid is costly due to its high price. Therefore, as for other methods for preventing the leakage of the high voltage, there is already a method: using a cleaning air to discharge all the cleaning liquid residing in the cleaning fluid flow path and the atomizing head cleaning flow path to prevent the leakage of the high voltage.

However, during the operation of discharging all the cleaning liquid residing in the cleaning fluid flow path and the atomizing head cleaning flow path, not only the amount of the wasted (used) cleaning liquid increases, but also the discharge duration of the cleaning liquid becomes longer. Furthermore, in the next cleaning operation, time is spent is filling the cleaning fluid in the cleaning fluid flow path and the atomizing head cleaning flow path that become empty. Hence, there is a problem regarding the increase in the cost.

An object of an embodiment of the prevent invention is to provide an electrostatic coating apparatus capable of reducing cost.

An embodiment of the present invention relates to an electrostatic coating apparatus comprising: a housing having a front side as a coating machine mounting portion; a coating machine mounted at the coating machine mounting portion, comprising an air motor having a hollow rotating shaft and a rotary atomizing head which is located at a front side of the air motor and being disposed on the rotating shaft; a tank disposed in the housing and configured to store a coating material; a feed tube extending from the tank to the rotary atomizing head; and a high voltage generator disposed in the housing and configured to apply a high voltage to the coating material discharged from the feed tube, the electrostatic coating apparatus being characterized in comprising: an atomizing head cleaning flow path which is disposed at the coating machine and through which a cleaning fluid for cleaning the rotary atomizing head and the front end of the feed tube flows; a cleaning fluid flow path connecting a cleaning fluid supply source to the atomizing head cleaning flow path; a cleaning fluid valve disposed in the cleaning fluid flow path and configured to open and close the cleaning fluid flow path; a discharge air flow path connected to the atomizing head cleaning flow path and through which the discharge air flows; a cleaning fluid discharge flow path connected to the cleaning fluid flow path at a connection point located between the atomizing head cleaning flow path and the cleaning fluid valve; a discharge air switching valve disposed in the atomizing head cleaning flow path and configured to open and close the atomizing head cleaning flow path; and a cleaning fluid discharge valve disposed in the cleaning fluid discharge flow path and configured to open and close the cleaning fluid discharge flow path.

An embodiment in accordance with the present invention can reduce the cost.

DETAILED DESCRIPTION OF EMBODIMENTS

An electrostatic coating apparatus in accordance with an embodiment of the present invention will be described in detail in accordance with the figures.

Figure 1:
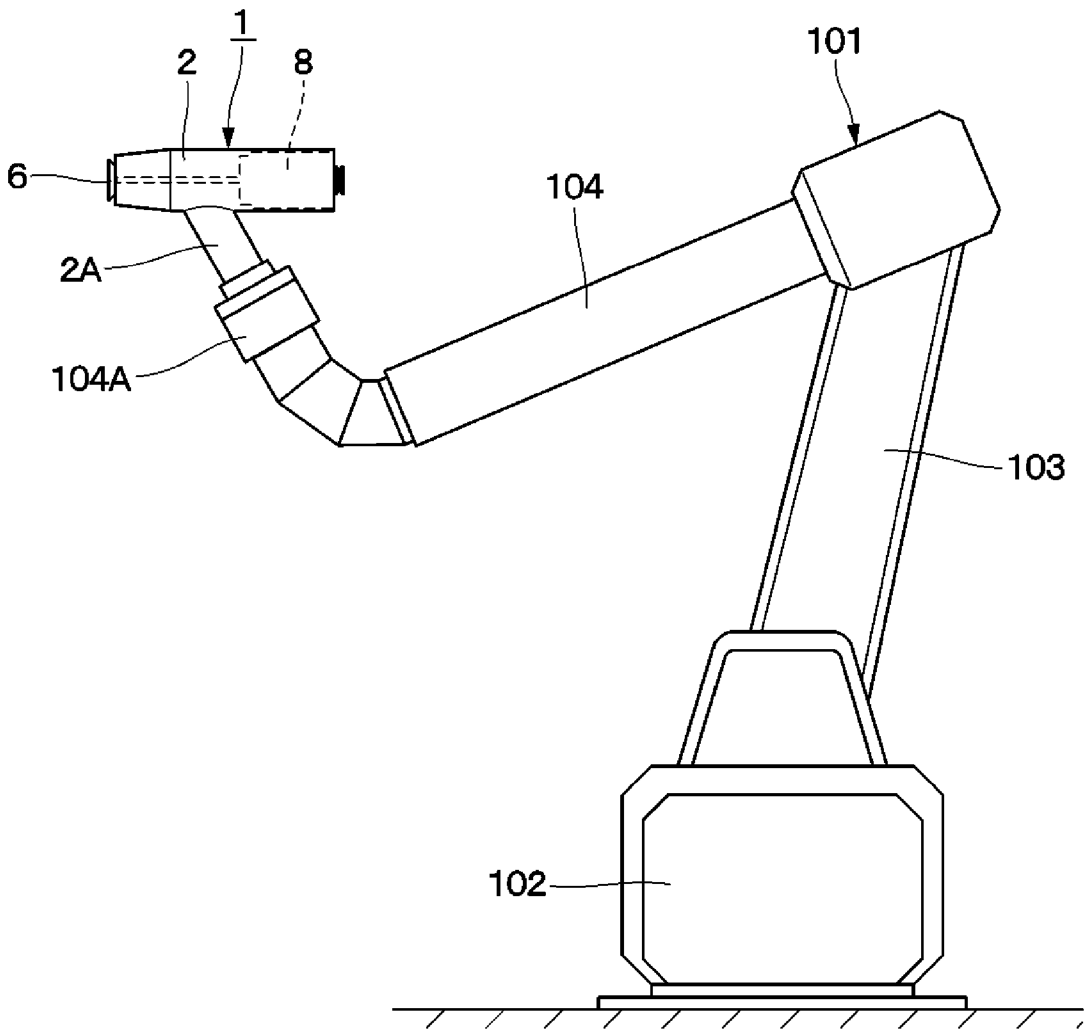
FIG. 1 is an overall schematic block diagram showing a state in which an electrostatic coating apparatus in accordance with a first embodiment of the present invention is mounted to a coating robot.
Figure 2:
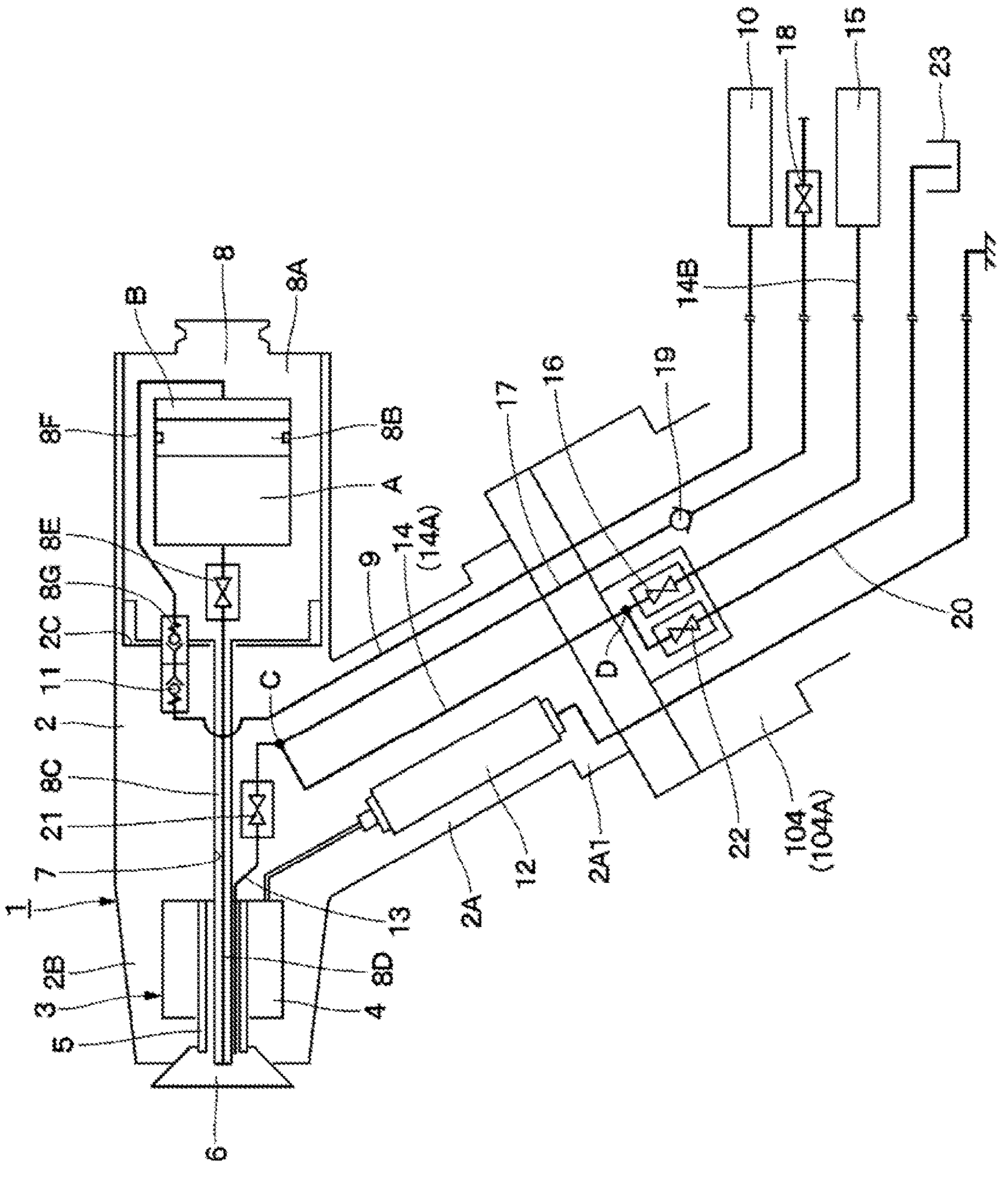
FIG. 2 is a schematic diagram showing that the electrostatic coating apparatus in FIG. 1 is enlarged together with a bracket of an arm portion of the coating robot.
Figure 3:
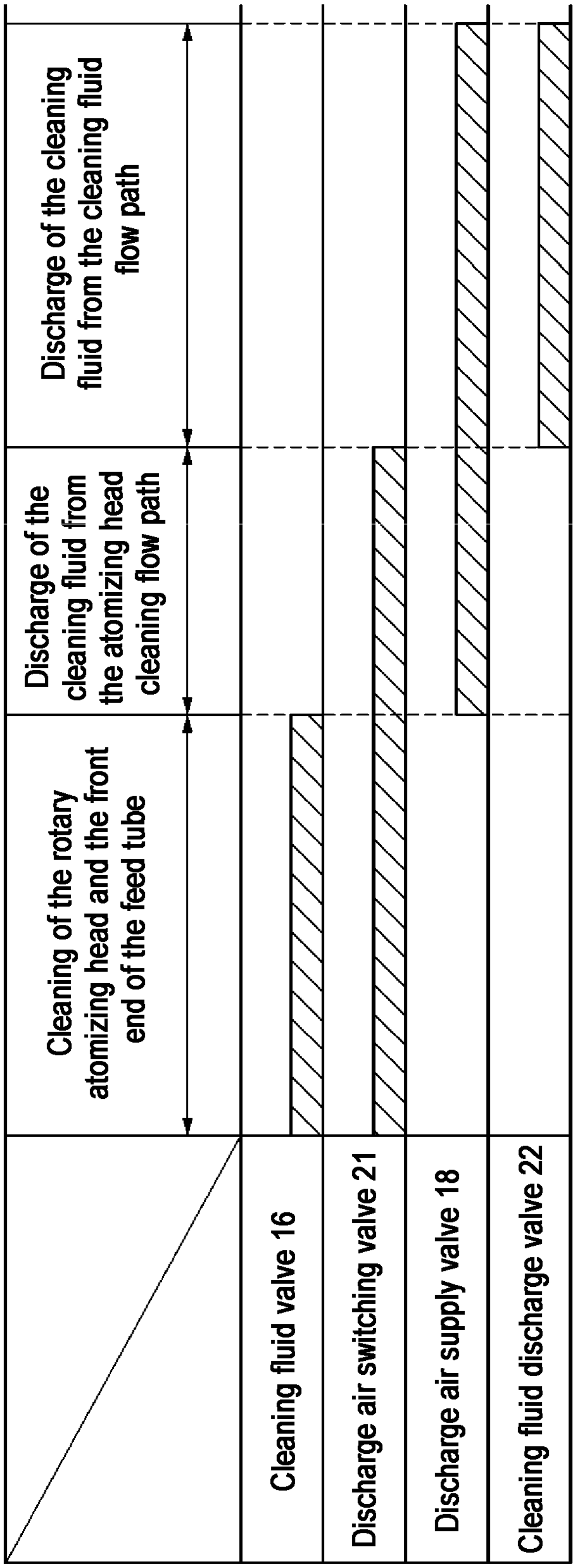
FIG. 3 is a timechart showing the operation of cleaning the rotary atomizing head of the electrostatic coating apparatus and the front end of the feed tube.

First, FIG. 1-3 show a first embodiment of the present invention. In the first embodiment, a cartridge type electrostatic coating apparatus is described as a representative example of the electrostatic coating apparatus, in which a cartridge comprising a tank and a feed tube is detachably mounted to a housing.

In FIG. 1, a coating robot 101 is configured to include a base 102, a vertical arm 103 being operably disposed on the base 102, and a horizontal arm 104 as an arm portion being rotatably disposed at a front end of the vertical arm 103. The front end of the horizontal arm 104 becomes a rotatable bracket 104A. A housing 2 of the cartridge type electrostatic coating apparatus 1 is mounted on the bracket 104A of the horizontal arm 104.

Next, the structure of the cartridge type electrostatic coating apparatus 1 in accordance with the first embodiment of the present invention will be described. The cartridge type electrostatic coating apparatus 1 is a directly-charged type electrostatic coating apparatus which directly applies a high voltage to a coating material by a high voltage generator 12. In addition, the cartridge type electrostatic coating apparatus 1 has a rotary atomizing head type coating machine 3 for spraying a coating material from a rotary atomizing head 6 rotating at a high speed.

The cartridge type electrostatic coating apparatus 1 is mounted at the front end of the horizontal arm 104 of the coating robot 101. As shown in FIG. 2, the cartridge type electrostatic coating apparatus 1 includes a housing 2, a coating machine 3, a cartridge 8, a high voltage generator 12, an atomizing head cleaning flow path 13, a cleaning fluid flow path 14, a cleaning fluid valve 16, a discharge air flow path 17, a check valve 19, a cleaning fluid discharge flow path 20, a discharge air switching valve 21, and a cleaning fluid discharge valve 22.

The housing 2 is formed as a stepped cylindrical body which extends in a front-rear direction. The housing 2 is configured with a neck portion 2A extending outward in a diameter direction from an intermediate portion in the front-rear direction. The front end of the neck portion 2A becomes a mounting portion 2A1. The mounting portion 2A1 of the neck portion 2A of the housing 2 is mounted on the bracket 104A of the horizontal arm 104 of the coating robot 101.

In addition, the front side of the housing 2 becomes a coating machine mounting portion 2B opened forward. An air motor 4 of the coating machine 3, which will be described later, is mounted at the coating machine mounting portion 2B. On the other hand, the rear side of the housing 2 becomes a cartridge mounting portion 2C opened rearward. A tank 8A of the cartridge 8, which will be described later, is detachably mounted to the cartridge mounting portion 2C. The housing 2 is configured with a feed tube through hole 7, which will be described later, a high voltage generator 12, and the like.

The coating machine 3 is mounted to the coating machine mounting portion 2B of the housing 2. The coating machine 3 is configured to include an air motor 4, a rotary shaft 5, and a rotary atomizing head 6. The air motor 4 of the coating machine 3 is mounted to the coating machine mounting portion 2B. The rotary shaft 5 is rotatably supported at the center of the air motor 4. The air motor 4 makes the rotary shaft 5 and the rotary atomizing head 6 rotate at a high speed, for example, 3,000 rpm-150,000 rpm by supplying the driving air from the exterior to an air turbine (not shown). In addition, the rotary shaft 5 is formed as a hollow cylindrical body. A rotary atomizing head 6 is mounted at the front end of the rotary shaft 5. Further, an inner peripheral side of the rotary shaft 5 forms a portion of the feed tube through hole 7.

The rotary atomizing head 6 of the coating machine 3 is located on the front side of the air motor 4 and is disposed on the rotating shaft 5. The rotary atomizing head 6 is formed in a cup shape whose diameter increases from the rear side to the front side. The rotary atomizing head 6 is rotated at a high speed with the rotary shaft 5 by the air motor 4 to atomize and spray the coating material supplied from the feed tube 8C of the cartridge 8

The feed tube through hole 7 is formed extending from the center of the bottom portion of the coating machine mounting portion 2B toward the inside of the rotary shaft 5. The feed tube 8C of the cartridge 8 is inserted into the feed tube through hole 7.

The cartridge 8 is detachably mounted to the cartridge mounting portion 2C of the housing 2. A plurality of cartridges 8 are prepared, for example, and are mounted to the housing 2 alternately per one coating operation. The cartridge 8 includes the tank 8A and the feed tube 8C. The tank 8A of the cartridge 8 is formed as a cylindrical tank and detachably mounted to the cartridge mounting portion 2C. A piston 8B is slidably inserted into the hollow tank 8A in the front-rear direction. As a result, the interior of the tank 8A is partitioned into a front side coating material chamber A and a rear side extrusion liquid chamber B by the piston 8B.

In addition, the cartridge may also be a structure using a bag-like cartridge configured with a bag-like thin film forming a partition wall in the tank. In this case, the interior of the bag-like thin film becomes a coating material chamber, and a gap between the bag-like thin film and the tank becomes an extrusion liquid chamber.

The feed tube 8C extends forward from the front center of the tank 8A toward the rotary atomizing head 6. The feed tube 8C is inserted into the feed tube through hole 7. In this inserted state, the front end of the feed tube 8C projects from the rotary shaft 5 and extends into the rotary atomizing head 6.

In addition, the cartridge 8 is configured with a coating material passage 8D extending from the coating material chamber A to the front end of the feed tube 8C and a coating material valve 8E for opening or closing the coating material passage 8D. Further, the cartridge 8 is configured with an extrusion liquid passage 8F connected to the extrusion liquid chamber B, and a tank side opening/closing valve 8G disposed in the front of the tank 8A and opening and closing the extrusion liquid passage 8F. The tank-side opening/closing valve 8G abuts against a housing-side opening/closing valve 11 to open when the tank 8A is mounted to the cartridge mounting portion 2C.

The extrusion liquid supply path 9 is a passage for supplying an extrusion liquid from the extrusion liquid supply source 10 toward the extrusion liquid passage 8F (extrusion liquid chamber B) of the cartridge 8. The extrusion liquid supply path 9 is configured with the housing-side opening/closing valve 11 at the bottom side of the cartridge mounting portion 2C of the housing 2. The housing-side opening/closing valve 11 is opened by abutting against the tank-side opening/closing valve 8G.

The high voltage generator 12 is disposed at the housing 2. The high voltage generator 12 applies a high voltage to the coating material discharged from the feed tube 8C of the cartridge 8. The high voltage generator 12 is composed of, for example, a Cockcroft circuit. The high voltage generator 12 boosts the voltage supplied from a power supply device (not shown) to, for example, −60 to −120 kV. The output side of the high voltage generator 12 is for example electrically connected to the air motor 4. Thus, the high voltage generator 12 can directly apply a high voltage to the coating material through the air motor 4, the rotating shaft 5, and the rotary atomizing head 6.

The atomizing head cleaning flow path 13 is disposed at the coating machine 3. The cleaning fluid for cleaning the rotatory atomizing head 6 and the front end of the feed tube 8C of the cartridge 8 flows in the atomizing head cleaning flow path 13; an upstream side of the atomizing head cleaning flow path 13 is connected to the cleaning fluid flow path 14 and the discharge air flow path 17 at a junction point C. A downstream side of the atomizing head cleaning flow path 13 extends to the front end of the feed tube 8C by utilizing the gap between the rotating shaft 5 and the feed tube 8C.

The cleaning fluid comprises, for example, a cleaning liquid and a cleaning air (compressed air) in which a thinner, an alcohol etc. is mixed in water. In the first embodiment, an inexpensive cleaning liquid having a low electric resistance is used.

The cleaning fluid flow path 14 connects the cleaning fluid supply source 15 with the atomizing head cleaning flow path 13. The cleaning fluid flow path 14 for example extends in the horizontal arm 104 of the coating robot 101 and the neck portion 2A of the housing 2. The downstream side of the cleaning fluid flow path 14 is connected to the atomizing head cleaning flow path 13 at a joining point C, and supplies the cleaning liquid and the cleaning air alternately and simultaneously. The junction point C is disposed closer to the downstream side of the flow direction of the cleaning fluid than the junction point disclosed below The cleaning fluid valve 16 is disposed in the cleaning fluid flow path 14. The cleaning fluid valve 16 opens and closes the cleaning fluid flow path 14 to control the supply and stop of the cleaning fluid. The cleaning fluid valve 16 is disposed on the bracket 104A of the horizontal arm 104 of the coating robot 101.

Next, the configuration of the discharge air flow path 17, the discharge air supply valve 18, the check valve 19, the cleaning fluid discharge flow path 20, the discharge air switching valve 21 and the cleaning fluid discharge valve 22, which serve as the feature portions of the first embodiment, will be described.

The discharge air flow path 17 is connected to the atomizing head cleaning flow path 13 at the junction point C. The discharge air flows in the discharge air flow path 17. The discharge air discharges the cleaning fluid (cleaning liquid) residing in the atomizing head cleaning flow path 13 and the downstream side flow path 14A of the cleaning fluid flow path 14. An upstream side of the discharge air flow path 17 is connected to the discharge air supply valve 18, and a downstream side of the discharge air flow path 17 extends in the neck portion part 2A of the housing 2 and is connected to the upstream side of the atomizing head cleaning flow path 13. The discharge air supply valve 18 is connected to a discharge air supply source (not shown). The junction point C where the discharge air flow path 17 is connected to the atomizing head cleaning flow path 13 is located closer to the downstream side than a connection point D between the cleaning fluid discharge flow path 20 and the cleaning fluid flow path 14.

The check valve 19 is disposed in the discharge air flow path 17. The check valve 19 allows the discharge air to flow toward the atomizing head cleaning flow path 13 to prevent reverse flow. As a result, the check valve 19 prevents a portion of the cleaning fluid flowing from the cleaning fluid flow path 14 toward the atomizing head cleaning flow path 13 from flowing to the side of the discharge air supply valve 18 through the discharge air flow path 17.

The cleaning fluid discharge flow path 20 is connected to the cleaning fluid flow path 14 at the connection point D located between the atomizing head cleaning flow path 13 and the cleaning fluid valve 16. Here, the connection point D is located directly behind the downstream side of the cleaning fluid valve 16 in the flow direction of the cleaning fluid. In addition, the connection point D is disposed on the bracket 104A of the horizontal arm 104. In addition, the other end of the cleaning fluid discharge flow path 20 is connected to a waste liquid tank 23. The connection point D is located closer to the upstream side in the flow direction of the cleaning fluid than the junction point C.

The discharge air switching valve 21 is disposed in the atomizing head cleaning flow path 13. The discharge air switching valve 21 is located closer to the downstream side in the flow direction of the cleaning fluid than the junction point C. The discharge air switching valve 21 opens and closes the atomizing head cleaning flow path 13. Specifically, when the discharge air switching valve 21 is opened, the cleaning fluid from the cleaning fluid supply source 15 can be supplied to the rotary atomizing head 6 through the atomizing head cleaning flow path 13. In addition, when the discharge air switching valve 21 is opened, the discharge air (compressed air) from the discharge air supply valve 18 (discharge air supply source) can be supplied to the atomizing head cleaning flow path 13 through the discharge air flow path 17.

On the other hand, when the discharge air switching valve 21 is closed, the discharge air supply valve 18 and the cleaning fluid discharge valve 22 are opened to switch the flow of the discharge air from the discharge air supply source to the side of the cleaning fluid flow path 14. In this case, the cleaning fluid (cleaning liquid) residing on the cleaning fluid flow path 14 can be discharged by discharge air.

The cleaning fluid discharge valve 22 is disposed in the cleaning fluid discharge flow path 20. The cleaning fluid discharge valve 22 together with the cleaning fluid valve 16 is mounted on the bracket 104A of the horizontal arm 104 of the coating robot 101. The cleaning fluid discharge valve 22 opens and closes the cleaning fluid discharge flow path 20. The cleaning fluid discharge valve 22 closes when the cleaning fluid valve 16 is open to prevent the cleaning fluid from flowing to the side of the cleaning fluid discharge flow path 20. On the other hand, by opening the cleaning fluid discharge valve 22, the cleaning fluid pushed out from the cleaning fluid flow path 14 by the discharge air is discharged to the waste liquid tank 23 through the cleaning fluid discharge flow path 20.

The cartridge type electrostatic coating apparatus 1 in accordance with the first embodiment has the above structures. Next, an example of a coating operation by the cartridge type electrostatic coating apparatus 1 and an example of a cleaning operation of the rotary atomizing head 6 will be described.

First, in the cartridge type electrostatic coating apparatus 1, the cartridge 8 is mounted in the housing 2. At this time, the feed tube 8C of the cartridge 8 is inserted into the feed tube through hole 7, and the tank 8A is mounted at the cartridge mounting portion 2C. After the cartridge 8 is mounted in the housing 2, the extrusion liquid is supplied from the extrusion liquid supply source 10 to the extrusion liquid chamber B through an extrusion liquid supply path 9 and the extrusion liquid passage 8F.

Thus, the coating material in the coating material chamber A is pushed by the piston 8B and discharged toward the rotary atomizing head 6 through the coating material passage 8D. At this time, the rotary atomizing head 6 is rotated at a high speed by the air motor 4. Therefore, the rotary atomizing head 6 sprays the supplied coating material as coating material particles toward the object to be coated Upon coating, a high voltage is applied by the high voltage generator 12 to the rotary atomizing head 6 via the rotating shaft 5. Thus, the coating material particles sprayed from the rotary atomizing head 6 are charged to the high voltage. Therefore, the coating material particles sprayed from the rotary atomizing head 6, namely, the charged coating material particles can fly toward the object to be coated connected to the ground and can be efficiently applied.

Next, an example of the operation of cleaning the rotary atomizing head 6 and the front end of the feed tube 8C of the cartridge 8, an example of the operation of discharging the cleaning fluid (cleaning liquid) residing in the atomizing head cleaning flow path 13 and an example of the operation of discharging the cleaning fluid (cleaning liquid) residing in the cleaning fluid flow path 14 will be described with reference to the schematic diagram of FIG. 2 and the time chart of FIG. 3.

In the operation of cleaning the rotary atomizing head 6 and the front end of the feed tube 8C of the cartridge 8, the cleaning fluid valve 16 and the discharge air switching valve 21 are opened, and the discharge air supply valve 18 and the cleaning fluid discharge valve 22 are closed. At this time, the cleaning fluid from the cleaning fluid supply source 15 is discharged via the cleaning fluid flow path 14 from the atomizing head cleaning flow path 13 toward the rotary atomizing head 6 and the front end of the feed tube 8C. Hence, the coating material adhered to the rotary atomizing head 6 and the front end of the feed tube 8C can be cleaned by the cleaning fluid.

Next, in the operation of discharging the cleaning fluid (cleaning liquid) residing in the atomizing head cleaning flow path 13, the opening of the discharge air switching valve 21 and the closing of the cleaning fluid discharge valve 22 are performed continuously, the cleaning fluid valve 16 is closed, and the discharge air supply valve 18 is opened. In this state, the discharge air from the discharge air supply source is supplied through the discharge air flow path 17 to the atomizing head cleaning flow path 13. Thus, the cleaning fluid residing in the atomizing head cleaning flow path 13 can be discharged to the exterior by discharge air.

Then, in the operation of discharging the cleaning fluid (cleaning liquid) residing in the cleaning fluid flow path 14, the opening of the discharge air supply valve 18 and the opening of the cleaning fluid valve 16 are performed continuously, the discharge air switching valve 21 is closed, and the cleaning fluid discharge valve 22 is opened. At this time, the discharge air from the discharge air supply source flows through the discharge air flow path 17 into the cleaning fluid flow path 14. That is, the discharge air discharges the cleaning fluid residing in the downstream side flow path 14A of the cleaning fluid flow path 14 located closer to the side of the atomizing head cleaning flow path 13 than the cleaning fluid valve 16 through the cleaning fluid discharge flow path 20, so that the downstream side flow path 14A becomes a cavity. On the other hand, the cleaning fluid resides in an upstream side flow path 14B of the cleaning fluid flow path 14 from the cleaning fluid supply source 15 to the cleaning fluid valve 16 (connection point D). Thus, in the next coating operation, the coating machine 3 can be maintained in an insulated state by the cavity portion of the downstream side flow path 14A serving as a portion of the downstream side of the cleaning fluid flow path 14.

FIG. 3 shows the open state and closed state of the cleaning fluid valve 16, the discharge air switching valve 21, the discharge air supply valve 18, and the cleaning fluid discharge valve 22 in the operation of cleaning the rotary atomizing head 6 and the front end of the feed tube 8C of the cartridge 8, the operation of discharging the cleaning fluid residing in the atomizing head cleaning flow path 13 and the operation of discharging the cleaning fluid residing in the cleaning fluid flow path 14. The slant line portions shown in FIG. 3 represent the open state, and the blank portions represent the closed state.

Therefore, in the first embodiment, the electrostatic coating apparatus 1 comprises: the atomizing head cleaning flow path 13 which is disposed at the coating machine 3 and through which a cleaning fluid for cleaning the rotary atomizing head 6 and the front end of the feed tube 8C of the cartridge 8 flows; the cleaning fluid flow path 14 connecting the cleaning fluid supply source with the atomizing head cleaning flow path 13; the cleaning fluid valve 16 disposed in the cleaning fluid flow path 14 and configured to open or close the cleaning fluid flow path 14; the discharge air flow path 17 connected to the atomizing head cleaning flow path 13 and through which the discharge air flows; the cleaning fluid discharge flow path 20 connected to the cleaning fluid flow path 14 at a connection point D located between the atomizing head cleaning flow path 13 and the cleaning fluid valve 16; the discharge air switching valve 21 disposed in the atomizing head cleaning flow path 13 and configured to open and close the atomizing head cleaning flow path 13; and the cleaning fluid discharge valve 22 disposed in the cleaning fluid discharge flow path 20 and configured to open and close the cleaning fluid discharge flow path 20.

Therefore, when the rotary atomizing head 6 and the front end of the feed tube 8C of the cartridge 8 are cleaned, the discharge air switching valve 21 is opened, the cleaning fluid valve 16 is opened, and the cleaning fluid discharge valve 22 is closed. Thus, the rotary atomizing head 6 or the like can be cleaned by supplying the cleaning fluid to the atomizing head cleaning flow path 13 through the cleaning fluid flow path 14.

In addition, after the rotary atomizing head 6 is cleaned, the discharge air switching valve 21 is opened, the cleaning fluid valve 16 is closed, and the cleaning fluid discharge valve 22 is closed. In this state, the cleaning fluid residing in the atomizing head cleaning flow path 13 can be discharged by supplying the discharge air through the discharge air flow path 17.

After the cleaning fluid in the atomizing head cleaning flow path 13 is discharged, the discharge air switching valve 21 is closed, the cleaning fluid valve 16 is closed, and the cleaning fluid discharge valve 22 is opened. In this state, discharge air is supplied from the discharge air flow path 17 toward the cleaning fluid flow path 14. Thus, in the cleaning fluid flow path 14, the cleaning fluid residing in the downstream side flow path 14A located between the atomizing head cleaning flow path 13 and the cleaning fluid valve 16 can be discharged by the discharge air from the discharge air supply source. As a result, since the cleaning fluid flow path 14 becomes an insulated state by making the downstream side flow path 14A become a cavity, even in the case where a high voltage is directly applied to the coating material, the high voltage can be prevented from leaking through the cleaning fluid flow path 14.

Figure 6:
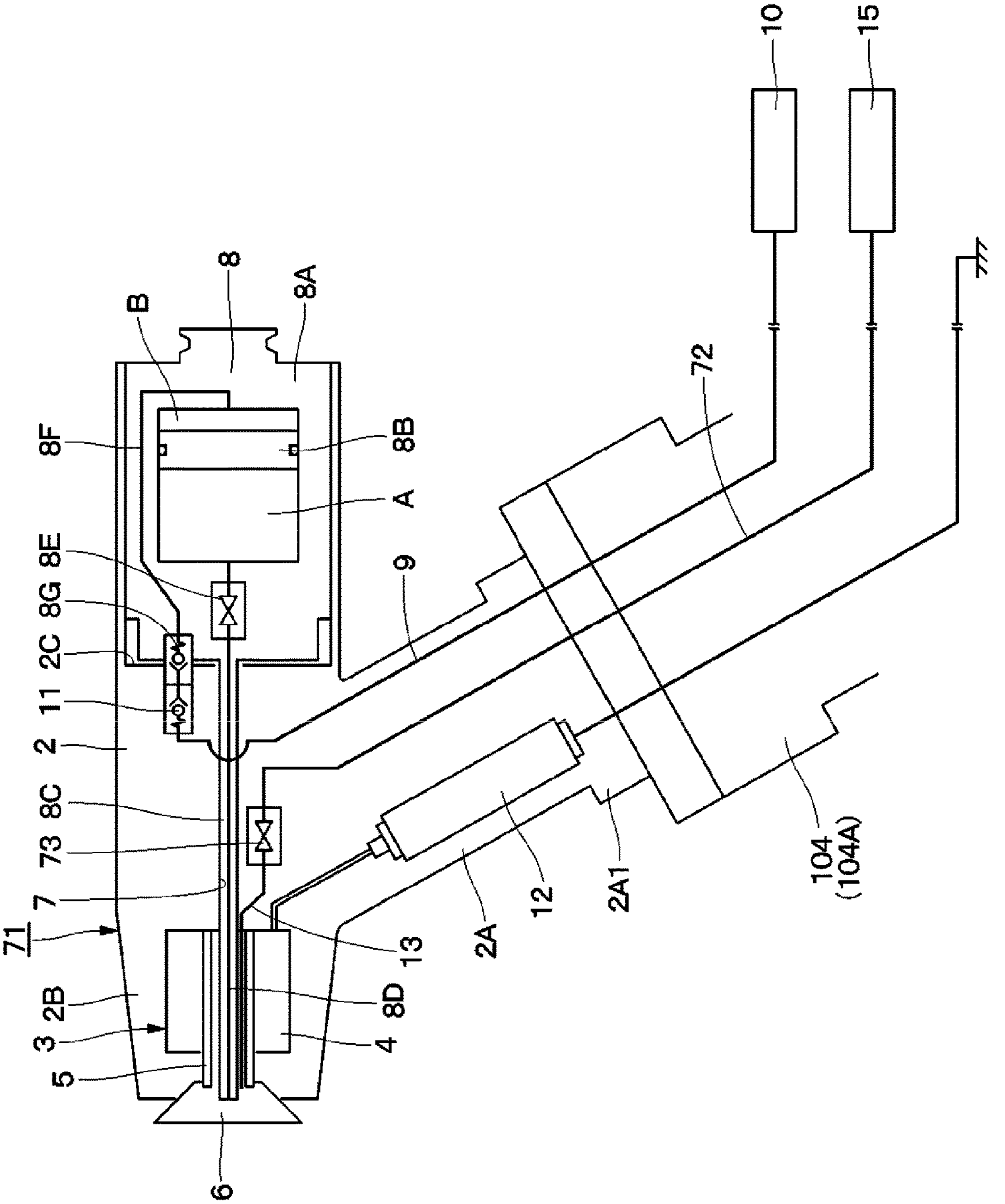
FIG. 6 is a schematic diagram showing an electrostatic coating apparatus in accordance with a comparative example from the same position as that of FIG. 2.

Here, FIG. 6 shows a cartridge type electrostatic coating apparatus 71 in accordance with a comparative example. A cleaning fluid flow path 72 connects the cleaning fluid supply source 15 with the atomizing head cleaning flow path 13. Further, a cleaning fluid valve 73 for opening and closing the atomizing head cleaning flow path 13 is disposed in the atomizing head cleaning flow path 13. In the cartridge type electrostatic coating apparatus 71 in accordance with the comparative example constructed in this manner, by opening the cleaning fluid valve 73, the cleaning fluid can be supplied to the rotary atomizing head 6 and the front end of the feed tube 8C through the atomizing head cleaning flow path 13. In addition, the leakage of the high voltage can be prevented upon coating by using the cleaning air to discharge the cleaning fluid (cleaning liquid) residing in the entire length of the cleaning fluid flow path 72.

However, in the cartridge type electrostatic coating apparatus 71 in accordance with the comparative example, since the cleaning liquid residing in the entire length of the cleaning fluid flow path 72 is discharged, the amount of the wasted cleaning liquid tends to increase. Further, in a case where the range of discharging the cleaning liquid is long (e.g., in the entire length of the cleaning fluid flow path 72), the cleaning liquid resides as droplets on the inner surface of the cleaning fluid flow path 72, and the leakage of the high voltage might be caused through the conductance of the droplets.

In this regard, in the cartridge type electrostatic coating apparatus 1 in accordance with the first embodiment, in the cleaning fluid flow path 14, the cleaning liquid of the cleaning fluid can be made reside in the upstream side flow path 14B from the cleaning fluid supply source 15 to the cleaning fluid valve 16. On the other hand, the cleaning liquid can be discharged from the downstream side flow path 14A closer to the side of the coating machine 3 than the cleaning fluid valve 16.

That is, the cartridge type electrostatic coating apparatus 1 can minimize the consumption of the cleaning liquid and can also prevent the leakage of the high voltage as compared with the cartridge type electrostatic coating apparatus 71 in accordance with the comparative example in which the discharge air flow path 17 and the cleaning fluid discharge flow path 20 are omitted. As a result, it is possible to seek to reduce the amount of the wasted (used) cleaning liquid, shorten the discharge time of the cleaning liquid, simplify the structure and control, and to reduce the cost. Furthermore, the range in which the cleaning liquid is discharged is only the downstream-side flow path 14A serving as a portion of the cleaning fluid flow path 14. Therefore, the cleaning liquid can be discharged without leaving the droplets by supplying the compressed air to a short flow path. In this aspect, the leakage of the high voltage can also be prevented.

A cartridge mounting portion 2C is disposed on the rear side of the housing 2. The tank 8A and the feed tube 8C constitute the cartridge 8, wherein the feed tube 8C is inserted into the rotating shaft 5 and the tank 8A is detachably mounted at the cartridge mounting portion 2C. Thus, the cartridge 8 can be mounted in the housing 2 alternately.

The discharge air supply valve 18 for opening and closing the discharge air flow path 17 is disposed in the discharge air flow path 17. The discharge air from the discharge air supply source can be supplied to the discharge air flow path 17 by opening the discharge air supply valve 18.

The discharge air flow path 17 is configured with a check valve 19 which allows the discharge air to flow toward the atomizing head cleaning flow path 13 and prevents reverse flow. As a result, the check valve 19 prevents a portion of the cleaning fluid flowing from the cleaning fluid flow path 14 toward the atomizing head cleaning flow path 13 from flowing to the side of the discharge air supply valve 18 through the discharge air flow path 17.

In addition, the housing 2 is mounted on the bracket 104A of the horizontal arm 104 of the coating robot 101. Furthermore, the cleaning fluid valve 16 and the cleaning fluid discharge valve 22 are mounted on the bracket 104A of the horizontal arm 104. Thus, the cleaning fluid valve 16 and the cleaning fluid discharge valve 22 can be disposed by utilizing the horizontal arm 104 of the coating robot 101. In addition, the cleaning fluid valve 16 and the cleaning fluid discharge valve 22 are arranged at a position close to the coating machine 3. Accordingly, the downstream side flow path 14A of the cleaning fluid flow path 14 between the cleaning fluid valve 16, the cleaning fluid discharge valve 22 and the atomizing head cleaning flow path 13 (junction point C) can be shortened. As a result, the amount of the cleaning liquid discharged from the downstream side flow path 14A can be reduced.

The connection point D between the cleaning fluid discharge flow path 20 and the cleaning fluid flow path 14 is disposed on the bracket 104A of the horizontal arm 104 serving as an arm portion. This makes it possible to reduce the amount of cleaning liquid residing in the cleaning fluid flow path 14 between the cleaning fluid valve 16 and the connection point D.

Further, the discharge air flow path 17 is connected to the atomizing head cleaning flow path 13 (junction point C) at a position closer to the downstream side than the connection point D between the cleaning fluid discharge flow path 20 and the cleaning fluid flow path 14. Accordingly, the downstream side flow path 14A of the cleaning fluid flow path 14 located between the connection point D and the junction point C can become a cavity by discharging the cleaning fluid. Thus, the downstream side flow path 14A of the cleaning fluid flow path 14 can be set as an insulating region, and the leakage of the high voltage can be prevented.

Figure 4:
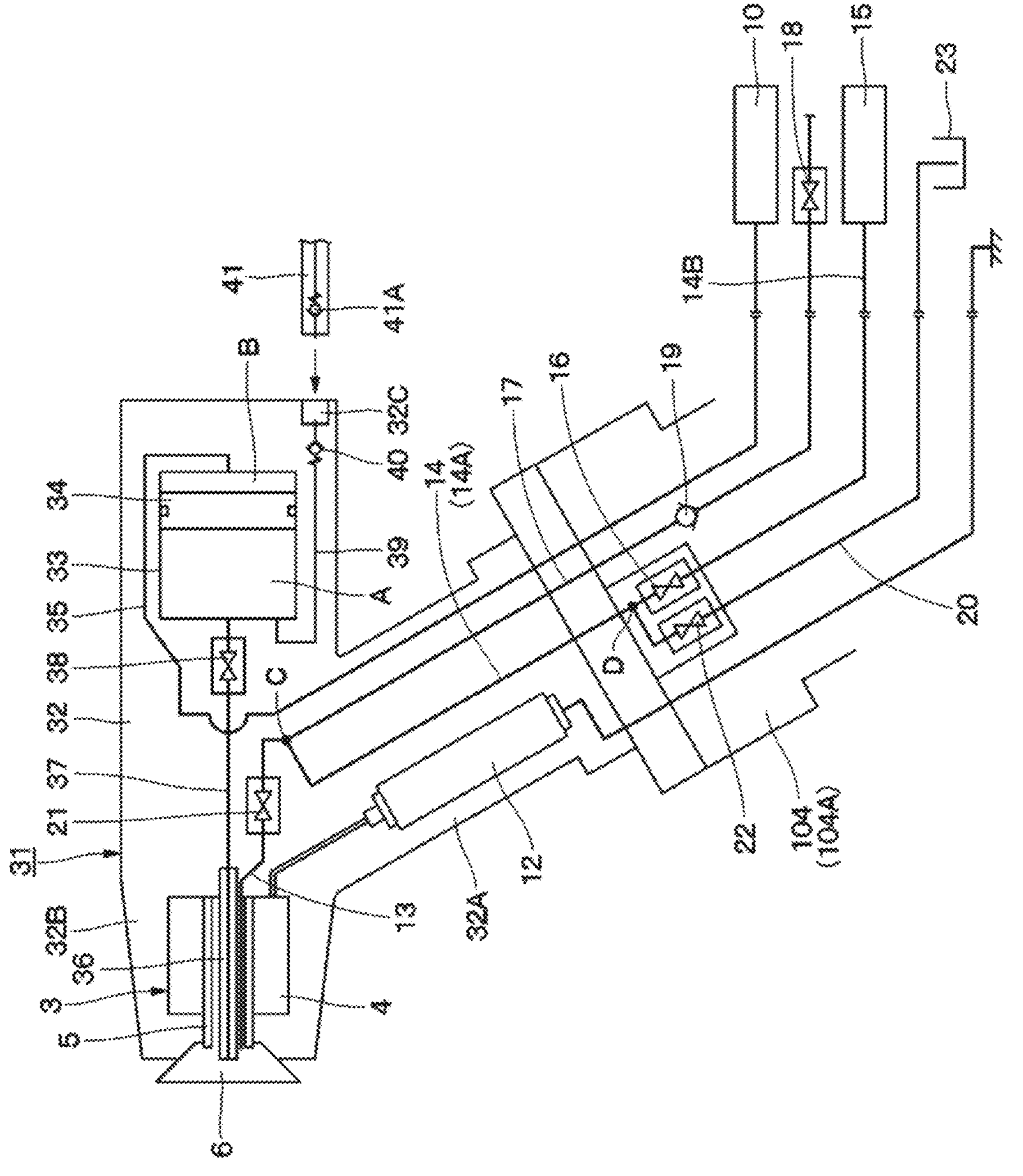
FIG. 4 is a schematic view showing an electrostatic coating apparatus in accordance with a second embodiment from the same position as that of FIG. 2.

FIG. 4 shows a second embodiment of the present invention. The second embodiment is characterized in that the tank is fixed to the housing, and the coating material is filled in the coating material chamber in the tank from the exterior via a nozzle attachable to and detachable from the housing. In addition, in the second embodiment, the same structural elements as those of the first embodiment are denoted by the same reference numerals, and the description thereof is omitted.

In FIG. 4, the electrostatic coating apparatus 31 has a housing 32. The housing 32 has a neck portion 32A and a coating machine mounting portion 32B. In addition, a tank 33 is integrally disposed on the rear side of the housing 32. The interior of the tank 33 is partitioned into a coating material chamber A and an extrusion liquid chamber B by a piston 34. An extrusion liquid supply/discharge path 35 for supplying and discharging the extrusion liquid is connected to the extrusion liquid chamber B. Further, the housing 32 is configured with a nozzle connection port 32C, for example, located on the rear end face.

The feed tube 36 is mounted in the housing 32 in a state in which the interior of the rotating shaft 5 extends forward toward the rotary atomizing head 6. A coating material passage 37 is configured to be extending from the coating material chamber A of the tank 33 to the front end of the feed tube 36. In addition, the housing 32 is configured with a coating material valve 38 for opening and closing the coating material passage 37.

The coating material filling flow path 39 is disposed in the housing 32 in a state of connecting the coating material chamber A with the nozzle connection port 32C. In the coating material filling flow path 39, a housing-side opening/closing valve 40 is disposed at the bottom side of the nozzle connection port 32C. The housing-side opening/closing valve 40 is opened by abutting against a nozzle-side opening/closing valve 41A of a coating material filling nozzle 41 described below.

The coating material filling nozzle 41 for filling the coating material from a coating material supply source (not shown) is connected to the nozzle connection port 32C of the housing 32. The coating material filling nozzle 41 is configured with the nozzle-side opening/closing valve 41A. The nozzle-side opening/closing valve 41A is opened by abutting against the housing-side opening/closing valve 40 when a front end of the coating material filling nozzle 41 is connected to the nozzle connection port 32C of the housing 32. In addition, in addition to the coating material, the coating material filling nozzle 41 can supply a cleaning fluid for cleaning the tank 33 and the coating material passage 37.

Therefore, in the second embodiment configured in this manner, the effect similar to that of the first embodiment described above can be obtained. In particular, according to the second embodiment, even for the electrostatic coating apparatus 31 in which the tank 33 is fixed in the housing 32 in a non-removable manner, the operation of cleaning the rotary atomizing head 6 and the operation of discharging the cleaning liquid by using the atomizing head cleaning flow path 13, the cleaning fluid flow path 14, and the discharge air flow path 17 can also be applied to the electrostatic coating apparatus 31.

Figure 5:
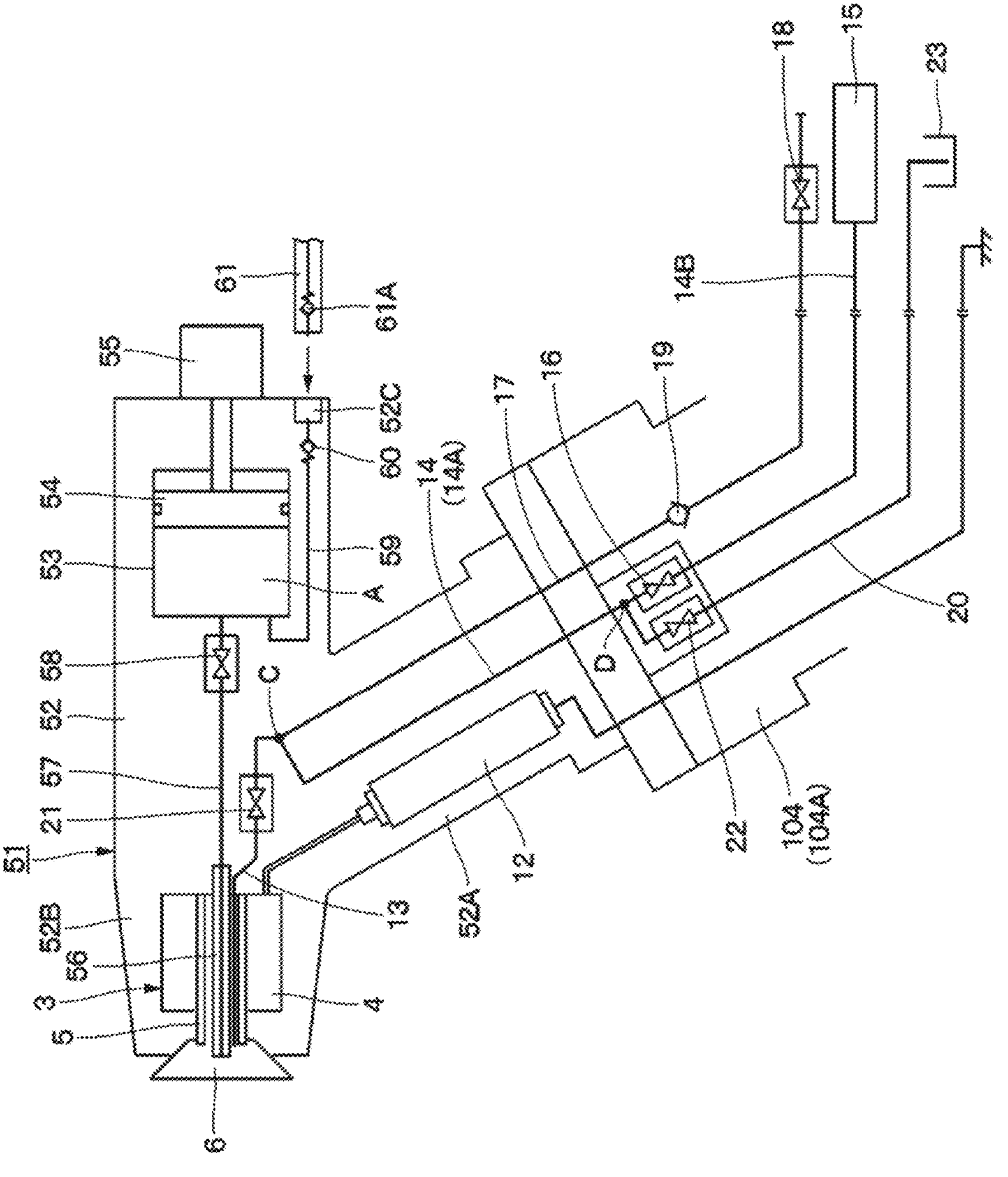
FIG. 5 is a schematic view showing an electrostatic coating apparatus in accordance with a third embodiment from the same position as that of FIG. 2.

Next, FIG. 5 shows a third embodiment of the present invention. The third embodiment is characterized in that the tank is fixed in the housing, a motor for pressing the piston in the tank is disposed, and the coating material is filled in the coating material chamber in the tank from the exterior via a nozzle attachable to and detachable from the housing. On the other hand, in the third embodiment, the structure related to the extrusion liquid is deleted. In addition, in the third embodiment, the same structural elements as those of the first embodiment are denoted by the same reference numerals, and the description thereof is omitted.

In FIG. 5, the electrostatic coating apparatus 51 has a housing 52. The housing 52 has a neck portion 52A and a coating machine mounting portion 52B. In addition, a tank 53 is integrally disposed on the rear side of the housing 52. A piston 54 movable in the front-rear direction is inserted into the tank 53. Thus, a coating material chamber A is located at the front side in the tank 53.

A motor 55 for moving the piston 54 in the front-rear direction is disposed in the rear of the housing 52. The piston 54 is pushed by the motor 55 to thereby discharge the coating material in the coating material chamber A. The motor 55 is, for example, a servo motor and has a ball screw mechanism for converting rotational motion into linear motion. Further, the housing 52 is configured with a nozzle connection port 52C for example located on the rear end face.

The feed tube 56 is mounted in the housing 52 in a state in which the interior of the rotating shaft 5 extends forward toward the rotary atomizing head 6. A coating material passage 57 is configured extending from the coating material chamber A of the tank 53 to the front end of the feed tube 56. In addition, the housing 52 is configured with a coating material valve 58 for opening and closing the coating material passage 57.

The coating material filling flow path 59 is disposed in the housing 52 in a state of connecting the coating material chamber A with the nozzle connection port 52C. In the coating material filling flow path 59, a housing-side opening/closing valve 60 is disposed at the bottom side of the nozzle connection port 52C. The housing-side opening/closing valve 60 is opened by abutting against a nozzle-side opening/closing valve 61A of a coating material filling nozzle 61 described below.

The coating material filling nozzle 61 for filling the coating material from a coating material supply source (not shown) is connected to the nozzle connection port 52C of the housing 52. The coating material filling nozzle 61 is configured with the nozzle-side opening/closing valve 61A. The nozzle-side opening/closing valve 61A is opened by abutting against the housing-side opening/closing valve 60 when a front end of the coating material filling nozzle 61 is connected to the nozzle connection port 52C of the housing 52. In addition, in addition to the coating material, the coating material filling nozzle 61 can supply a cleaning fluid for cleaning the tank 53 and the coating material passage 57.

Thus, in the third embodiment configured in this manner, the effect similar to that of the first embodiment described above can be obtained. In particular, according to the third embodiment, even for the electrostatic coating apparatus 51 in which the tank 53 is fixed in the housing 52 and the motor 55 is used to discharge the coating material in the tank 53, the operation of cleaning the rotary atomizing head 6 and the operation of discharging the cleaning liquid by using the atomizing head cleaning flow path 13, the cleaning fluid flow path 14, and the discharge air flow path 17 can also be applied to the electrostatic coating apparatus 51.

In addition, the first embodiment exemplarily illustrates a case where the cleaning fluid valve 16 and the cleaning fluid discharge valve 22 are configured in the bracket 104A of the horizontal arm 104 of the coating robot 101. However, the present invention is not limited thereto. For example, a structure that the cleaning fluid valve 16 and the cleaning fluid discharge valve 22 are configured in the horizontal arm 104, the vertical arm 103, the housing 2 or the like in addition to the bracket 104A may also be employed. The structure can also be applied to the second embodiment and third embodiment.

REFERENCE SIGNS

1, 31, 51: ELECTROSTATIC COATING APPARATUS
2, 32, 52: HOUSING
2B, 32B, 52B: COATING MACHINE MOUNTING PORTION
2C: CARTRIDGE MOUNTING PORTION
3: COATING MACHINE
4: AIR MOTOR
5: ROTATING SHAFT
6: ROTARY ATOMIZING HEAD
8: CARTRIDGE
8A: TANK
8C, 36, 56: FEED TUBE
12: HIGH VOLTAGE GENERATOR
13: ATOMIZING HEAD CLEANING FLOW PATH
14: CLEANING FLUID FLOW PATH
15: CLEANING FLUID SUPPLY SOURCE
16: CLEANING FLUID VALVE
17: DISCHARGE AIR FLOW PATH
18: DISCHARGE AIR SUPPLY VALVE
19: CHECK VALVE
20: CLEANING FLUID DISCHARGE FLOW PATH
21: DISCHARGE AIR SWITCHING VALVE
22: CLEANING FLUID DISCHARGE VALVE
101: COATING ROBOT
104: HORIZONTAL ARM (ARM PORTION)
104A: BRACKET
D: CONNECTION POINT

What is claimed is:

1. An electrostatic coating apparatus, comprising:

a housing having a front side as a coating machine mounting portion;

a coating machine mounted at the coating machine mounting portion, comprising an air motor having a hollow rotating shaft and a rotary atomizing head which is located at a front side of the air motor and being disposed on the hollow rotating shaft;

a tank disposed in the housing and configured to store a coating material;

a feed tube extending from the tank to the rotary atomizing head;

a high voltage generator disposed in the housing and configured to apply a high voltage to the coating material discharged from the feed tube;

an atomizing head cleaning flow path which is disposed at the coating machine and through which a cleaning fluid for cleaning the rotary atomizing head and a front end of the feed tube flows;

a cleaning fluid flow path connecting a cleaning fluid supply source to the atomizing head cleaning flow path;

a cleaning fluid valve disposed in the cleaning fluid flow path and configured to open and close the cleaning fluid flow path;

a discharge air flow path connected to the atomizing head cleaning flow path and through which discharge air flows;

a cleaning fluid discharge flow path connected to the cleaning fluid flow path at a connection point located between the atomizing head cleaning flow path and the cleaning fluid valve;

a discharge air switching valve disposed in the atomizing head cleaning flow path and configured to open and close the atomizing head cleaning flow path; and a cleaning fluid discharge valve disposed in the cleaning fluid discharge flow path and configured to open and close the cleaning fluid discharge flow path;

wherein the atomizing head cleaning flow path is in fluid connection with the cleaning fluid flow path to enable the cleaning fluid in the cleaning fluid supply source to clean the rotary atomizing head and the front end of the feed tube flows; and wherein the atomizing head cleaning flow path is configured to be placed in fluid connection with a waste liquid tank through the cleaning fluid discharge flow path, the cleaning fluid discharge flow path in fluid connection with the cleaning fluid flow path upstream of the cleaning fluid valve.

2. The electrostatic coating apparatus of claim 1, wherein a discharge air supply valve for opening and closing the discharge air flow path is disposed in the discharge air flow path.

3. The electrostatic coating apparatus of claim 1, wherein:

a cartridge mounting portion is disposed on a rear side of the housing; and the tank and the feed tube constitute a cartridge, the feed tube is inserted into the hollow rotating shaft and the tank is detachably mounted at the cartridge mounting portion.

4. The electrostatic coating apparatus of claim 1, wherein a check valve, which allows the discharge air to flow toward the atomizing head cleaning flow path and prevents reverse flow, is disposed in the discharge air flow path.

5. The electrostatic coating apparatus of claim 1, wherein:

the housing is mounted on a bracket of an arm portion of a coating robot, and the cleaning fluid valve and the cleaning fluid discharge valve are mounted on the bracket of the arm portion.

6. The electrostatic coating apparatus of claim 5, wherein the connection point between the cleaning fluid discharge flow path and the cleaning fluid flow path is configured on the bracket of the arm portion.

7. The electrostatic coating apparatus of claim 1, wherein the discharge air flow path is connected to the atomizing head cleaning flow path at a position closer to a downstream side than the connection point between the cleaning fluid discharge flow path and the cleaning fluid flow path.

8. The electrostatic coating apparatus of claim 1, wherein the high voltage generator is electrically connected to the air motor and applies the high voltage to the coating material discharged from the feed tube at the rotary atomizing head.

9. The electrostatic coating apparatus of claim 1, wherein the tank comprises:

a coating material chamber, wherein the coating material chamber is located at a front side of the tank, wherein the feed tube extends from the coating material chamber to the rotary atomizing head, and an extrusion liquid chamber, wherein the extrusion liquid chamber is located at a rear side of the housing relative the coating material chamber, wherein the extrusion liquid chamber is configured to store an extrusion liquid.

10. The electrostatic coating apparatus of claim 9, further comprising:

an extrusion liquid flow path, wherein the extrusion liquid flow path connects an extrusion liquid supply source to the extrusion liquid chamber.

11. The electrostatic coating apparatus of claim 10, further comprising:

a housing-side valve, and a tank-side valve, wherein the housing-side valve is configured to open in response to abutting the tank-side valve against the housing-side valve, wherein the tank-side valve abuts against the housing-side valve and opens in response to the tank being mounted to a cartridge mounting portion of the housing.

12. An electrostatic coating apparatus, comprising:

a housing having a front side as a coating machine mounting portion;

a coating machine mounted at the coating machine mounting portion, comprising an air motor having a hollow rotating shaft and a rotary atomizing head which is located at a front side of the air motor and being disposed on the hollow rotating shaft;

a tank disposed in the housing and configured to store a coating material, the tank comprising:

a coating material chamber, wherein the coating material chamber is located at a front side of the tank, and an extrusion liquid chamber, wherein the extrusion liquid chamber is located at a rear side of the housing relative the coating material chamber, wherein the extrusion liquid chamber is configured to store an extrusion liquid;

a feed tube extending from the tank to the rotary atomizing head, wherein the feed tube extends from the coating material chamber to the rotary atomizing head; and a high voltage generator disposed in the housing and configured to apply a high voltage to the coating material discharged from the feed tube;

an atomizing head cleaning flow path which is disposed at the coating machine and through which a cleaning fluid for cleaning the rotary atomizing head and a front end of the feed tube flows;

a cleaning fluid flow path connecting a cleaning fluid supply source to the atomizing head cleaning flow path;

a cleaning fluid valve disposed in the cleaning fluid flow path and configured to open and close the cleaning fluid flow path;

a discharge air flow path connected to the atomizing head cleaning flow path and through which discharge air flows;

a cleaning fluid discharge flow path connected to the cleaning fluid flow path at a connection point located between the atomizing head cleaning flow path and the cleaning fluid valve;

a discharge air switching valve disposed in the atomizing head cleaning flow path and configured to open and close the atomizing head cleaning flow path;

a cleaning fluid discharge valve disposed in the cleaning fluid discharge flow path and configured to open and close the cleaning fluid discharge flow path;

an extrusion liquid flow path connecting an extrusion liquid supply source to the extrusion liquid chamber;

a housing-side valve; and a tank-side valve, wherein the housing-side valve is configured to open in response to abutting a tank-side valve against the housing-side valve; and wherein the tank-side valve abuts against the housing-side valve and opens in response to the tank being mounted to a cartridge mounting portion of the housing.

13. The electrostatic coating apparatus of claim 12, wherein a discharge air supply valve for opening and closing the discharge air flow path is disposed in the discharge air flow path, and wherein a check valve, which allows the discharge air to flow toward the atomizing head cleaning flow path and prevents reverse flow, is disposed in the discharge air flow path.

14. The electrostatic coating apparatus of claim 12, wherein:

a cartridge mounting portion is disposed on a rear side of the housing; and the tank and the feed tube constitute a cartridge, the feed tube is inserted into the hollow rotating shaft and the tank is detachably mounted at the cartridge mounting portion.

15. The electrostatic coating apparatus of claim 12, wherein:

the housing is mounted on a bracket of an arm portion of a coating robot, and the cleaning fluid valve and the cleaning fluid discharge valve are mounted on the bracket of the arm portion.

16. The electrostatic coating apparatus of claim 15, wherein the connection point between the cleaning fluid discharge flow path and the cleaning fluid flow path is configured on the bracket of the arm portion.

17. The electrostatic coating apparatus of claim 12, wherein the discharge air flow path is connected to the atomizing head cleaning flow path at a position closer to a downstream side than the connection point between the cleaning fluid discharge flow path and the cleaning fluid flow path.

18. The electrostatic coating apparatus of claim 12, wherein the high voltage generator is electrically connected to the air motor and applies the high voltage to the coating material discharged from the feed tube at the rotary atomizing head.

* * * * *